Nov. 22, 1960  J. M. BLANK  2,960,744
EQUILIBRIUM ATMOSPHERE TUNNEL KILNS FOR FERRITE MANUFACTURE
Filed Oct. 8, 1957  4 Sheets-Sheet 1
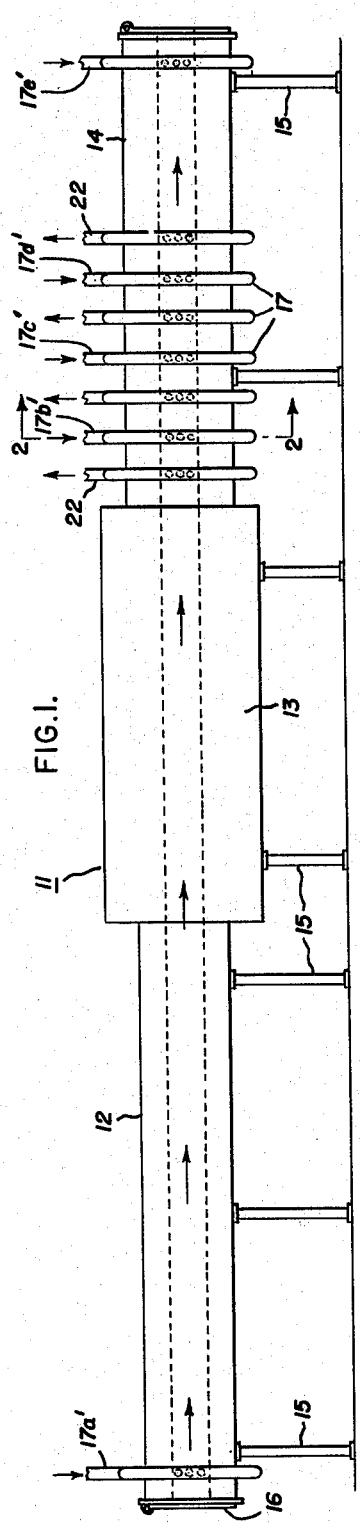
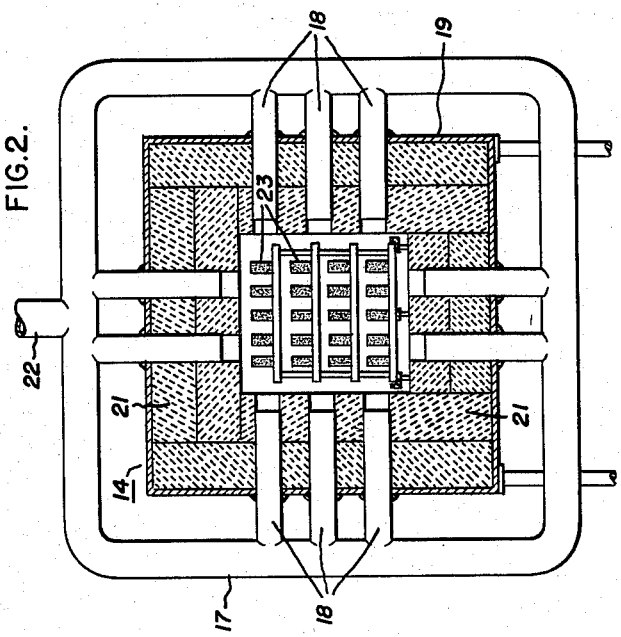
INVENTOR:
JOHN M. BLANK,
BY *Charles W. Helzer*
HIS ATTORNEY.

Nov. 22, 1960 — J. M. BLANK — 2,960,744
EQUILIBRIUM ATMOSPHERE TUNNEL KILNS FOR FERRITE MANUFACTURE

INVENTOR:
JOHN M. BLANK,
BY Charles W. Helzer
HIS ATTORNEY.

Nov. 22, 1960

J. M. BLANK 2,960,744

EQUILIBRIUM ATMOSPHERE TUNNEL KILNS FOR FERRITE MANUFACTURE

Filed Oct. 8, 1957

INVENTOR:
JOHN M. BLANK,
BY Charles W. Helfer
HIS ATTORNEY.

United States Patent Office 2,960,744
Patented Nov. 22, 1960

2,960,744

EQUILIBRIUM ATMOSPHERE TUNNEL KILNS FOR FERRITE MANUFACTURE

John M. Blank, Pennellville, N.Y., assignor to General Electric Company, a corporation of New York Filed Oct. 8, 1957, Ser. No. 688,955

3 Claims. (Cl. 25—142)

The present invention relates to new and improved tunnel kilns for manufacturing ferrite ceramic materials.

More particularly, the invention relates to new and improved tunnel kiln constructions for manufacturing commercial quantities of ferrite ceramic materials by firing ferrite forming materials in an atmosphere having a known oxygen content and temperature and subsequently cooling the ferrites in a plurality of different atmospheres having oxygen contents and temperatures determined from a preselected equilibrium atmosphere cooling schedule.

Ferrite materials are ceramic-like materials which have both high magnetic permeability and high volume resistivity in contrast to the magnetic metals which have high magnetic permeability but very low volume resistivity. Because of these characteristics, ferrite materials are ideally suited for use in the manufacture of deflection coils and fly-back transformer cores for television receiving sets, tuning slugs, filter elements, antenna cores, and a number of other practical applications. Conventional ceramic processing methods are used to convert metal-oxide raw materials into ferrites having desired magnetic characteristics. Heretofore the procedure has been to start with oxide raw materials which are substantially pure and have as fine a particle size as are commercially obtainable. These oxide raw materials are then mixed with a mixing medium usually water, and milled in a steel ball mill or other mixing devices such as colloid mill or attritor. After milling the homogeneous oxide mixture is oven dried and the resulting cake may then be presintered which consists of heat treating the oxide mixture at a temperature somewhat lower than a final firing temperature. After presintering, or if no presintering is used then after drying, the oxide mixture is comminuted to a particle size that is ceramically workable, and organic binders are usually added to serve as a binder and particle lubricant. Conventional means such as die pressing or extrusion are then used to press the oxide mixture into desired shapes, and the shaped oxide mixture is fired to a sintering temperature in a suitable furnace.

Heretofore, the oxide raw materials in ferrite manufacture were fired in furnaces or kilns having an air atmosphere, or at best in furnaces or kilns having 100% oxygen atmosphere, or some other fixed percentage oxygen content atmosphere which extended throughout the kiln or furnace. In co-pending patent application Serial No. 688,850, filed concurrently herewith, and entitled "Preparation of Ferromagnetic Ferrite Materials," John Blank, inventor, assigned to the General Electric Company, a method of manufacturing ferrites is disclosed which deals with the preparation by means of equilibrium atmospheres of ferrites containing two or more different cation species. The present invention discloses a new and improved tunnel kiln construction which is designed to carry out selected ones of the novel methods of manufacturing ferrite materials described in the above-identified co-pending patent application, to produce ferrites having predetermined and improved magnetic characteristics reproducibly in commercial quantities.

It is therefore a primary object of the present invention to provide a new and improved tunnel kiln for firing commercial quantities of ferrite ceramic materials in a plurality of controlled atmospheres at predetermined temperatures in accordance with a preselected equilibrium atmosphere schedule.

In practicing the invention, a tunnel kiln is provided for firing ferrite ceramic materials which incorporates a conveyor or other means for moving the ferrite ceramic materials through the tunnel kiln at a preselected speed, and which further includes means for effectively dividing the interior of the tunnel kiln into different zones having different temperatures and different atmospheres with respect to the oxygen content of the atmospheres.

Other objects, features and many of the attendant advantages of this invention will be appreciated more readily as the same becomes better understood by reference to the following detailed description, when considered in connection with the accompanying drawings, wherein like parts in each of the several figures are identified by the same reference character, and wherein:

Fig. 1 is a side view of a tunnel kiln constructed in accordance with the invention;

Fig. 2 is a cross-sectional view taken through plane 2—2 of the tunnel kiln illustrated in Fig. 1;

Figure 3:
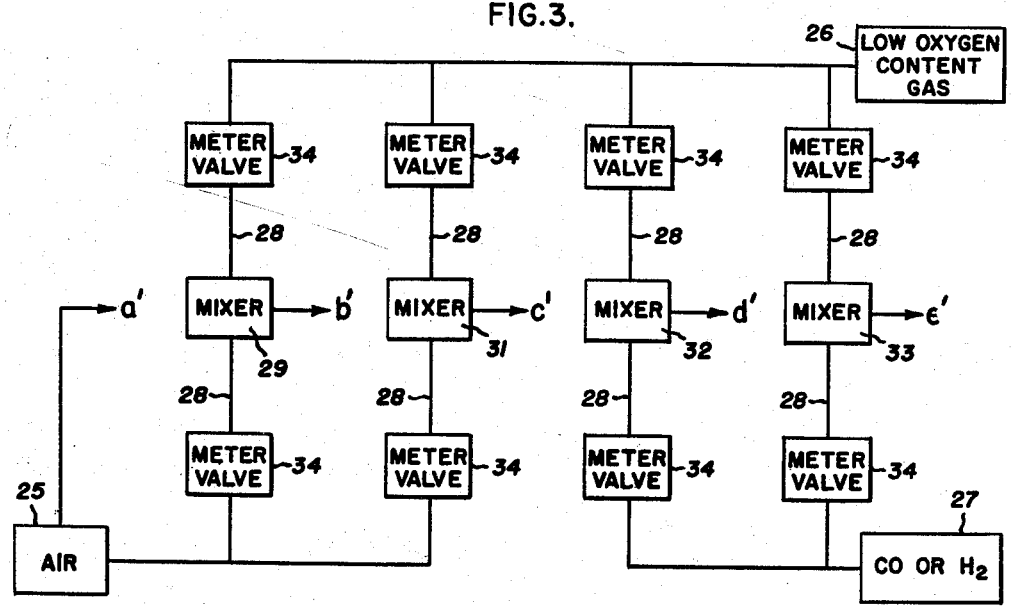
Fig. 3 is a schematic block diagram of a piping system suitable for providing gases having known oxygen contents to the tunnel kiln illustrated in Figs. 1 and 2 of the drawings.

In Fig. 1 a tunnel kiln 11 is illustrated which for the most part is of any conventional construction such, as is described on pages 211 through 250 of the text book entitled "Clay Products and Whitewares—Ceramics, vol. III," Edward P. MacNamara, author, published by the Division of Mineral Industries, Extension School of Mineral Industries, Pennsylvania State College, 1939. The tunnel kiln 11 comprises a pre-heating portion 12, a sintering portion 13, and a cooling portion 14, and is formed by an elongated refractory lined steel or cast iron casing supported on legs 15. Means (not shown) comprising a conveyor belt or wheeled truck riding on a track, or some other similar arrangement, are provided for moving the ferrite ceramic materials to be fired through the tunnel kiln at some predetermined speed. Ferrite forming materials to be fired in the tunnel kiln are inserted at the entrance 16 and move from left to right through tunnel kiln 11 on a conveyor belt or a wheeled truck riding on a track, or on some other similar mode of conveyance (not shown) to the exit of the kiln. For the purpose of loading ferrite forming materials in the kiln and unloading the fired ferrite from the kiln it is desirable that the kiln include a double-door air lock arrangement at the entrance and exit of the kiln in order to completely seal off the interior of the kiln from the atmosphere. In view of the fact such double-door entrance and exit sealing arrangements are known and can be obtained on commercially available kilns, it is not believed necessary to describe such arrangements in detail. In traveling through tunnel kiln 11, the ferrite forming materials are pre-heated in the pre-heating portion 12 of the tunnel kiln, soaked in the sintering portion 13 of the kiln at some predetermined peak sintering temperature, and thereafter cooled in the cooling portion 14 of the kiln.

In the heretofore mentioned respects tunnel kiln 11 is no different from previously known tunnel kilns. In the previously known tunnel kilns, however, the cooling gases used in the cooling portion usually extend throughout the entire length thereof so that all areas of the cooling portion are substantially identical insofar as the composition or makeup of the cooling gases is concerned. Tunnel kiln 11 differs from these previously known tunnel kilns in that the interior of the cooling portion 14 thereof is effectively divided into different zones having different temperatures and different atmospheres with respect to the oxygen content of the atmospheres. For this purpose, tunnel kiln 11 has been modified to include a plurality of manifolds 17 which encircle the tunnel kiln, and which have access to the interior thereof. The details of construction of the manifolds 17 encircling the tunnel kiln 11 are shown in Fig. 2 of the drawings. If the tunnel kiln 11 has a rectangular or square cross-sectional configuration, the manifolds 17 likewise are constructed in the form of a closed square loop by welding together appropriate length sections of iron or steel pipe which are of course hollow, and may be circular in cross-section. Each of the sides of the manifolds thus formed have branch pipes 18 secured thereto which extend through suitable openings formed in the sides, top and bottom of both the steel or iron casing 19, and refractory lining 21, and provide access to the interior of tunnel kiln 11. In order to assure air-tight sealing of the interior of tunnel kiln 11, the junctures of the branch pipes 18 with the exterior casing 19 are preferably welded so that the interior of the tunnel kiln is sealed closed from outside atmosphere. With the construction thus described, it is believed obvious that any cooling gas supplied to a particular manifold 17 is forced through all of the branch pipes 18 to the interior of the tunnel kiln 11 where it surrounds the ferrite pieces 23 being cooled in the immediate vicinity of the manifold. This result might be achieved with arrangements other than that illustrated in Fig. 2. For example, two intake or exhaust openings may be supplied to each manifold 17 which may be partitioned so that two sets of the branch pipes 18 serve as supply ports, while the two remaining sets of branch pipes 18 serve as exhaust ports. Further, the specific arrangement of the branch pipes 18 may be modified to include fewer or more pipes, or if desired, an entirely different arrangement which does not utilize a manifold 17 but incorporates direct piping may be used in place of that illustrated in Fig. 2. The primary requirement is that the arrangement be capable of supplying to the different zones "a"–"c" of the cooling portion 14 of the tunnel kiln gases having a known composition. For this purpose, in the arrangement shown in Fig. 1, certain of the manifolds 17 marked $17a'$; $17b'$; $17c'$; etc., on kiln 11 may serve as intake or supply manifolds, and others of the manifolds 17 may serve as exhaust manifolds. In other arrangements illustrated schematically in Fig. 5 of the drawing, the manifolds 17 all serve as intake or supply manifolds.

A means for supplying gases having known oxygen content to the various intake or supply manifolds (marked $17a'$–$17c'$ in the tunnel kiln construction of Fig. 1), is illustrated in Fig. 3 of the drawings. This means preferably comprises a plurality of sources of reservoirs 25, 26, and 27 of gases of known oxygen content. The source 25 may comprise a tank of compressed air or an air line coming from an air compressor which is capable of supplying air to the intake manifold $17a'$ at a pressure of about three pounds per square inch. Air is known to contain 20% oxygen so that source 25 constitutes one of the sources of gases of known oxygen content. The source 26 may constitute a tank of carbon dioxide gas (.001% 0–.008% $O_2$), agron gas, or the like for supplying such gas at a pressure of about three pounds per square inch. The purpose of source 27 is to provide a reducing (combustible) gas for making mixtures of lower oxygen content than the gas from source 26 by reacting with the gas of source 26 or with the oxygen in source 26, and for this purpose, source 27 may comprise a tank of carbon monoxide or a tank of hydrogen. Each of the sources 25, 26, and 27 is connected through suitable branch pipe lines 28 to a respective associated mixing device, 29, 31, 32, or 33. Connected in the branch pipe lines 28 are suitable metering valves 34 or 35. The mixing devices 29 through 33 have their outlets connected to a respective intake manifold $17b'$–$17e'$ on the cooling portion 14 of tunnel kiln 11. These mixing devices may comprise any means for mixing together two gases supplied thereto in order to assure a resultant mixture whose oxygen content is an average of the oxygen content of the two input gases, and may be required to handle volumes in ratios from three to one to two hundred to one (3:1 to 200:1). One suitable form of mixing device is known as a mixing tank and comprises an increased diameter portion of pipe having pebbles or other coarse material disposed therein, and has the two gases to be mixed connected to one end thereof at a higher pressure with the mixture of the two gases being taken from the remaining end at a lower pressure. The gases in diffusing through the pebbles or other coarse material are thoroughly mixed so that the resultant output mixture has an oxygen content which is an average of the oxygen content of the two input gases. A second form of mixing device suitable for use in the piping system illustrated in Fig. 3 comprises a pair of concentrically-arranged pipes wherein one gas is supplied through an inner pipe at a higher pressure than the gas to be mixed therewith which is supplied through the outer pipe. The concentric pipe arrangement may be achieved at a T or L joint, and is adequate to achieve proper mixing for most purposes. The metering valves 34 or 35 are included to assure that desired amounts of each of the gases of known oxygen content are supplied to the mixing devices 29 through 33 to result in an output gas having a known oxygen content suitable for supplying to the intake manifolds $17b'$–$17e'$ in the cooling portion 14 of the tunnel kiln. The meter valves 34 preferably comprise a modified globe valve having a flow meter included in the same housing. One such meter valve suitable for use as the meter valves 34 is marketed by the Waukee Engineering Company of Milwaukee, Wisconsin, and is identified as the Waukee flow meter. The meter valves 35 are used where small flow rates are involved, and comprise a flow meter having a needle valve attached thereto. One such meter valve arrangement suitable for small flow rates is manufactured and sold by the Fisher and Porter Company of Hatborough, Pennsylvania, and is identified as a variable area flow meter. It is of course desirable that appropriate numbers of cut-off valves (not shown) be included in the branch pipe lines 28 in order to save wear and tear on the meter valves, and to avoid the necessity of having to use the meter valves as cut-off valves should it be desired to inactivate any particular branch pipe line of the piping system. The pipes used in the piping system may comprise any standard cast iron pipe having an inside diameter in the neighborhood of a half inch or so, depending on the volumes of gas to be handled.

In operation, the air supply means shown in Fig. 3 has desired ones of the branch pipe lines 28 opened by opening the cut-off valves associated therewith. The meter valves 34 and 35 are then adjusted to supply to the mixing devices 29 through 33 the necessary amounts of each of the gases of known oxygen content to effect at the output of each of the mixing devices a gaseous mixture having the desired oxygen content to be supplied to the intake manifolds $17b'$–$17e'$. Intake manifold $17a'$ is connected directly to the source of air 25. This operation can be greatly facilitated by proper calibration of the meter valves 34 and 35.

Figure 4:
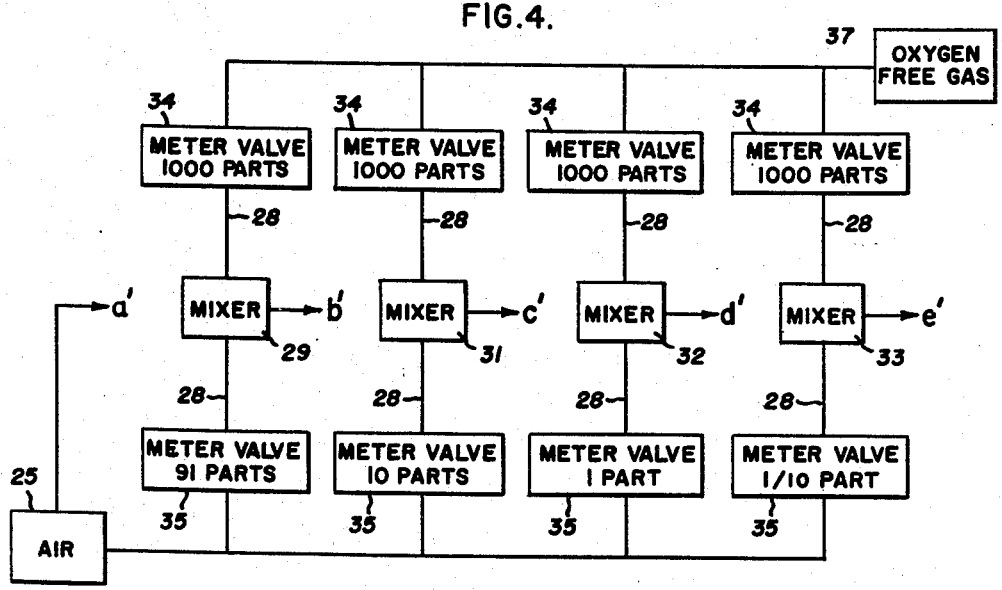
Fig. 4 is a schematic block diagram of an alternative piping system suitable for use in place of the piping system shown in Fig. 3.

An alternative system for supplying gases of known oxygen content to the various intake manifolds $17a'$–$17e'$ on cooling portion 14 of the tunnel kiln 11 is illustrated in Fig. 4 of the drawings. The system shown in Fig. 4 is suitable for use in commercial installations where relatively large quantities of gases are to be used and the cost of operating the system shown in Fig. 3 would be too high. In the arrangement shown in Fig. 4, like parts of the system shown in Fig. 3 have been identified with the same reference character and hence will not be again described in detail. The system shown in Fig. 4 differs from that illustrated in Fig. 3 only in the number and type of sources of gases of known oxygen content. In place of the low oxygen content gas 26 used in the system of Fig. 3, an essentially oxygen-free generator gas source or reservoir 37 is provided in the system of Fig. 4. The source 37 preferably comprises a gas generator which produces an essentially oxygen-free generator gas by means of the combustion of a combustible gas such as exalene or the like. One such gas generator which is suitable for use in the system of Fig. 4 is identified as the Exothermic gas producer manufactured by the Industrial Heating Department of the General Electric Company. In operation, the generator gas produced by source 37 is supplied through the branch pipe lines 28, and metering valves 34 to mixing devices 29–33, respectively, and the compressed air from the source 25 also is supplied through branch pipe lines 28 and metering valves 35 to the mixing devices 29 through 33. In the mixing devices the air is mixed with the generator gas to provide at the outlets $17b'$–$17e'$ cooling gases having known oxygen contents for use in the cooling portion 14 of the tunnel kiln.

In Fig. 5 of the drawings, the flow diagrams for four different arrangements for achieving practical stepwise equilibrium atmosphere cooling schedules with a tunnel kiln of the type illustrated in Fig. 1 of the drawings are disclosed. The flow diagram for the particular tunnel kiln construction shown in Fig. 1 of the drawings is illustrated in Fig. 5A. It is believed that the gas flow pattern is obvious from an examination of the drawings. To facilitate an understanding of the invention, the schematic outlines of the tunnel kiln in Figs. 5A–5D have been divided into five different zones "$a$"–"$e$," and the gases introduced at the intake manifolds $17a'$–$17e'$ are marked with primes ($a'$, $b'$, $c'$, etc.) to distinguish them from the kiln zones which are not primed.

Figure 5A:
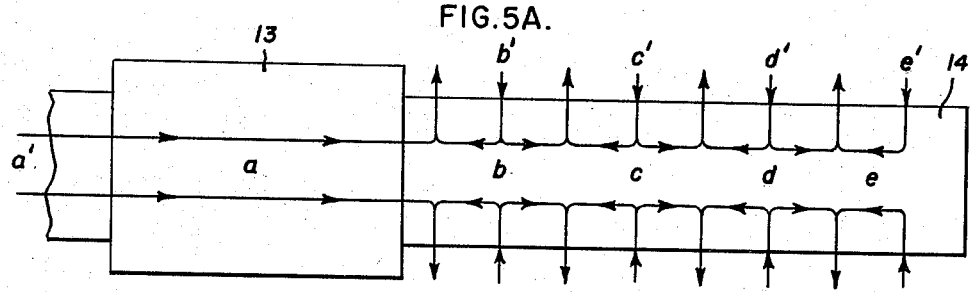
Figs. 5A through 5D are schematic flow diagrams illustrating a number of different gas flow patterns that may be set up within the tunnel kiln illustrated in Fig. 1.

In the arrangement illustrated in Fig. 5A of the drawings, the different atmospheric zones set up in the cooling portion 14 of the tunnel kiln have essentially the same oxygen content as the gases $a'$, $b'$, $c'$, $d'$, $e'$ fed to their respective associated intake manifolds $17a'$, $17b'$, etc. This arrangement provides relatively good isolation of the different zones of the cooling portion 14 of the tunnel kiln, and very little mixing of the different gases is achieved in that none of the gases of one zone can enter another zone by reason of the feature of exhausting at points intermediate each of the intake manifolds $17a'$, $17b'$, etc. This feature also provides relatively good control of the composition of the cooling gases used in the different zones of the cooling portion of the tunnel kiln, and allows a free choice of gas to be used in the sintering zone "$a$." The arrangement has the disadvantage of requiring a relatively long tunnel kiln to accommodate the length of cooling portion 14 required to accomplish the changes in the zones. Additionally it requires rather delicate adjustment of the rate of flow of the gases supplied to the intake manifolds $17a'$, etc., as well as a delicate adjustment of the rate of flow of gases out of the exhaust manifolds, and the gases exhausted through the exhaust manifolds are at a relatively high temperature.

Figure 5B:
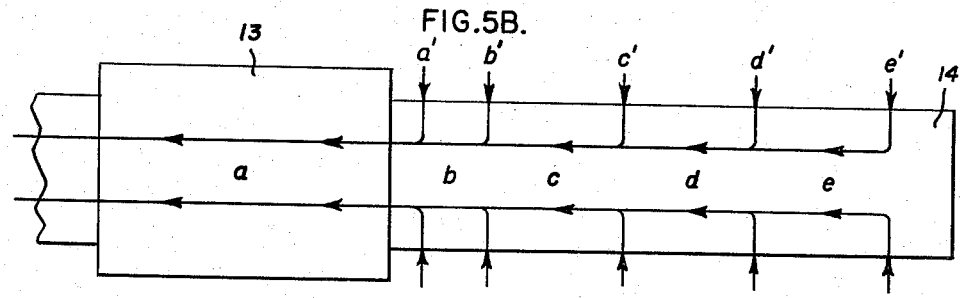

In the arrangement illustrated in Fig. 5B there are no exhaust ports or manifolds provided in the cooling portion 14 of the tunnel kiln, and all of the cooling gases supplied thereto are exhausted from the kiln through the sintering portion, and provide pre-heating of the ferrite forming materials being supplied by conveyor belt to the sintering zone "$a$." The arrangement of Fig. 5B is desirable in that it allows a very simple flow pattern of the gases within the tunnel kiln, and a simple control system providing economical use of the hot gases of the kiln. The arrangement has the disadvantage of introducing uncertainties as to the composition of the cooling gases in the various zones of the cooling portion 14 and the sintering portion 12 of the tunnel kiln because of the inability to control the extent and rate of mixing of the various cooling gases being supplied from the intake manifolds $17a'$–$17d'$. Additionally, the arrangement requires a relatively large flow of gases through the sintering zone "$a$" and it does not provide large percentages of oxygen content in the resulting atmosphere of the sintering zone.

Figure 5C:
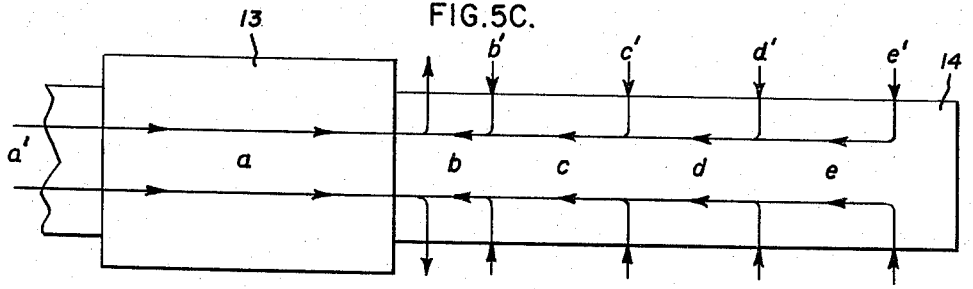

The cooling arrangement illustrated in Fig. 5C of the drawings contains most of the simplicity of the system illustrated in Fig. 5B, but allows a freer choice of the atmospheres used in the sintering zone "$a$." It has the disadvantage of exhausting relatively large amounts of high-temperature gases in that it requires the use of a relatively large amount of gases supplied to the sintering zone "$a$" from the intake end of the tunnel kiln to balance the flow of low oxygen content gases produced by the combined flow of cooling gases from the cooling zones "$b$," "$c$," "$d$," and "$e$."

Figure 5D:
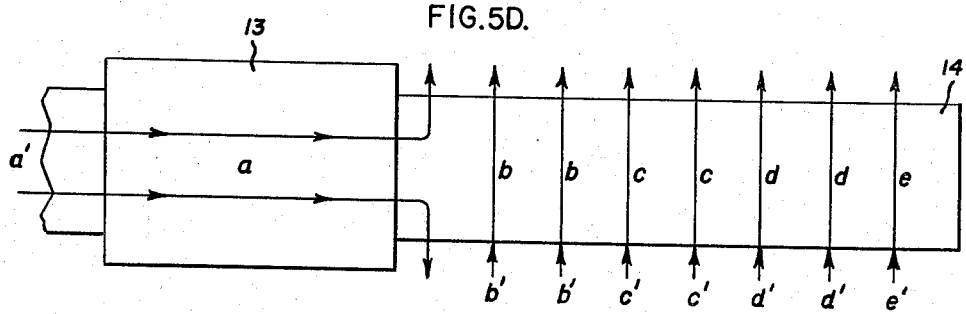

The arrangement illustrated schematically in Fig. 5D of the drawings provides relatively good isolation of the different zones of the cooling portion 14 of the tunnel kiln, and permits a free choice of the atmosphere to be used during sintering. Also, for sintering in oxygen, it requires a relatively small flow of oxygen through the sintering zone because the amount of other gases being exhausted with it is relatively small. The principal disadvantage of this system shown in Fig. 5D is its rather inefficient use of hot gases in the cooling portion 14 of the kiln where the flow of the gases is across the kiln, and the flow lines are short.

One example of the values of oxygen content and temperatures of the atmospheres for the different zones of a tunnel kiln constructed in accordance with the invention to provide equilibrium atmosphere cooling of a particular ferrite ceramic material are set forth in the tables below. The particular cooling schedule obtained by operation of the tunnel kiln in accordance with these values provides a four-step approximation to equilibrium atmosphere cooling for the particular ferrite compositions involved. It has been found in practice that this approximation is appropriate for use with both manganese-zinc ferrite compositions, and manganese-magnesium ferrite compositions. In this schedule the various intake manifolds $17a'$–$17d'$ have the following oxygen content in the gases supplied thereto—

Example No. 1:                           Oxygen
  $17a'$ _____ 20%
  $17b'$ _____ 2%
  $17c'$ _____ .2 of 1%
  $17d'$ _____ .02%
  $17e'$ _____ .002%

With the input gases supplied to the intake manifolds $17a'$–$17e'$ having the oxygen contents listed above, these input gases will produce atmospheres within the kiln which differ from one another in the four different methods of distributing the gases as exemplified by the flow diagram of Figs. 5A through 5D. In considering these examples, it is assumed that the rates of input flow of the gases (that is the volume of gases flowing past a given point per unit time) are equal in each input manifold, $a'$, $b'$, $c'$, $d'$ and $e'$. However, to achieve equilibrium atmosphere cooling of the ferrite materials in accordance with this data, the specified amounts of oxygen content in the atmospheres of the different zones must be adhered to, and in order to provide these atmospheres in practice it may be necessary that the input gases be supplied at different flow rates.

With the systems illustrated schematically in Figs. 5A and 5D of the drawings, the atmospheric zones set up in the cooling portion 14 of the tunnel kiln have essentially the same oxygen content as the oxygen content of the input gases supplied to them. That is to say that zone "a" has substantially the same oxygen content as the cooling gas supplied to intake manifold 17a', zone "b" the same oxygen content as the cooling gas supplied to intake manifold 17b', and so forth. There will be some mixing in the regions where the zones join, however, for the most part the atmospheres of the different zones have substantially the same oxygen content as the gases supplied to the intake manifolds. With the tunnel kiln 11 having gases supplied thereto with the oxygen contents listed above, and with the flow arrangements depicted in Figs. 5A and 5D of the drawings, the following approximation to an equilibrium atmosphere-temperature condition will be established in the kiln, if the temperatures are as stated at the boundaries between zones and the change in temperature within each zone is approximately linear with distance along the direction of travel of the ferrite materials being fired.

*Example #1—Figs. 5A and 5D flow patterns*

| Zone | O₂ Content (percent by volume) | Temperature (° Centigrade) |
|---|---|---|
| "a" | 20 | 1,400°. |
| "b" | 2 | 1,330° at boundary between "a" and "b." |
| "c" | 0.2 | 1,200° at boundary between "b" and "c." |
| "d" | 0.02 | 1,075° at boundary between "c" and "d." |
| "e" | 0.002 | 980° at boundary between "d" and "e." |

With respect to the flow pattern illustrated in Fig. 5B of the drawings, mixing is achieved between the different gases supplied to the intake manifolds 17a'–17e', and the following approximation to an equilibrium atmosphere-temperature condition will be established in the kiln. These results assume equal gas flow rates at all of the intake manifolds 17a'–17d', and that (with the exception of the first and possibly the last) the intake manifolds are equi-distant along the length of the cooling portion 14 of the tunnel kiln as illustrated schematically in the drawings. If the temperatures are as stated at the boundaries between zones and the change in temperature within each zone is approximately linear with distance along the direction of travel of the ferrite material being fired, the following atmosphere conditions will be established in the kiln—

| Zone | O₂ Content (percent by volume) | Temperature (° Centigrade) |
|---|---|---|
| "a" | 4.40 | 1,310°. |
| "b" | .550 | 1,240° at boundary between "a" and "b." |
| "c" | .074 | 1,130° at boundary between "b" and "c." |
| "d" | .011 | 1,040° at boundary between "c" and "d." |
| "e" | .002 | 970° at boundary between "d" and "e." |

With respect to the flow pattern illustrated in Figs. 5C of the drawings, and with the above listed gases supplied to the intake manifolds 17a'–17e', the following approximation to an equilibrium atmosphere-temperature condition will be established in the kiln if the temperatures are as stated at the boundaries between zones and the change in temperature within each zone is approximately linear with distance along the direction of travel of the ferrite forming materials being fired—

| Zone | O₂ Content (percent by volume) | Temperature (° Centigrade) |
|---|---|---|
| "a" | 20 | 1,440°. |
| "b" | .556 | 1,280° at boundary between "a" and "b." |
| "c" | .074 | 1,130° at boundary between "b" and "c." |
| "d" | .011 | 1,040° at boundary between "c" and "d." |
| "e" | .002 | 970° at boundary between "d" and "e." |

A second example of the values of oxygen content and temperatures of the atmospheres for the different cooling zones of a tunnel kiln constructed in accordance with the invention to provide equilibrium atmosphere cooling of the ferrite ceramic materials fired therein, is set forth hereinafter. The particular cooling schedule obtained by operation of a tunnel kiln in accordance with these values provides a four-step approximation to an equilibrium-atmosphere cooling schedule suitable to manufacture nickel-zinc ferrites having high magnetic permeabilities at signal frequencies of 1000 kilocycles per second. In this schedule the various intake manifolds 17a'–17c' have the following oxygen content in the gases supplied thereto—

*Example #2—Oxygen content of gases supplied to manifold*

| Zone No.: | O₂ content (percent by volume) |
|---|---|
| 17a' | 4.0 |
| 17b' | 0.5 |
| 17c' | 0.06 |
| 17d' | 0.008 |
| 17e' | 0.001 |

With the tunnel kiln 11 having gases supplied thereto with the oxygen contents listed above, and with the flow arrangements depicted in Figs. 5A and 5D of the drawings, the following approximation to an equilibrium atmosphere-temperature condition will be established in the kiln if the temperatures are as stated at the boundaries between the zones and the change in temperature within each zone is approximately linear with distance along the direction of travel of the ferrite forming materials being fired—

*Example #2—Figs. 5A and 5D flow patterns*

| Zone | O₂ Content (percent by volume) | Temperature (° Centigrade) |
|---|---|---|
| "a" | 4.0 | 1,480°. |
| "b" | 0.5 | 1,400° at boundary between "a" and "b." |
| "c" | 0.06 | 1,280° at boundary between "b" and "c." |
| "d" | 0.008 | 1,185° at boundary between "c" and "d." |
| "e" | 0.001 | 1,100° at boundary between "d" and "e." |

If gases having the oxygen content cited in Example #2 above are supplied to a tunnel kiln in a manner to establish the flow pattern illustrated in Fig. 5B of the drawings, mixing is achieved between the different gases supplied to the intake manifolds 17a'–17e'. Under these conditions the following approximation to an equilibrium atmosphere-temperature condition will be established in the kiln, assuming equal gas flow rates at all the intake manifolds 17a'–17d', that (with the exception of the first and possibly the last) the intake manifolds are equi-distant along the length of the cooling portion 14 of the tunnel kiln as illustrated schematically in the drawings and that the temperatures are as stated at the boundaries between the zones and the change in temperature within each zone is approximately linear with distance along the direction of travel of the ferrite forming materials being fired—

*Example #2—Fig. 5B flow pattern*

| Zone | O₂ Content (percent by volume) | Temperature (° Centigrade) |
|---|---|---|
| "a" | 0.91 | 1,380°. |
| "b" | 0.14 | 1,330° at boundary between "a" and "b." |
| "c" | 0.033 | 1,240° at boundary between "b" and "c." |
| "d" | 0.0045 | 1,155° at boundary between "c" and "d." |
| "e" | 0.001 | 1,080° at boundary between "d" and "e." |

If the flow pattern illustrated in Fig. 5C of the drawings is established in tunnel kiln 11 by gases having the oxygen content listed in Example #2, the following approximation to an equilibrium atmosphere-temperature condition will be established in the kiln if the temperatures are as stated at the boundaries between zones and the change in temperature within each zone is approximately linear with distance along the direction of travel of the ferrite forming materials being fired—

| Zone | $O_2$ Content (percent by volume) | Temperature (° Centigrade) |
| --- | --- | --- |
| "a" | 4.0 | 1,480° |
| "b" | 0.140 | 1,370° at boundary between "a" and "b." |
| "c" | 0.033 | 1,240° at boundary between "b" and "c." |
| "d" | 0.0045 | 1,155° at boundary between "c" and "d." |
| "e" | 0.001 | 1,080° at boundary between "d" and "e." |

In carrying out the cooling schedules set forth in Examples #1 and #2 above, it is understood that the ceramic ferrite material being processed cools in the last atmosphere listed to the neighborhood of about 200° to 300° centigrade whereupon, the material may be removed to room temperature conditions without damage to the material. In order to achieve such a long period of cooling in the last zone, it is usually necessary that the last cooling zone be physically longer than the other zones in the cooling portion 14 of the tunnel kiln. Further, from a consideration of the tables of values set forth in Examples #1 and #2, it can be appreciated that considerable adjustment is possible regarding any specific ferrite composition in order to provide a proper choice of cooling gases in the different zones of the cooling portion 14 of the tunnel kiln to achieve equilibrium atmosphere cooling. These adjustments must be made in practice to fit the temperature profile of the particular kiln involved, and to compensate for foreign sources of oxygen such as oxygen from the conveyance equipment, from the refractory, or from leaks and diffusion through the kiln casing. Accordingly, it can be appreciated that the above values are cited as being exemplary of the atmosphere and temperature gradients obtained with one particular kiln constructed in accordance with the teachings of the present invention, and may not be applicable to a different kiln.

Figure 6:
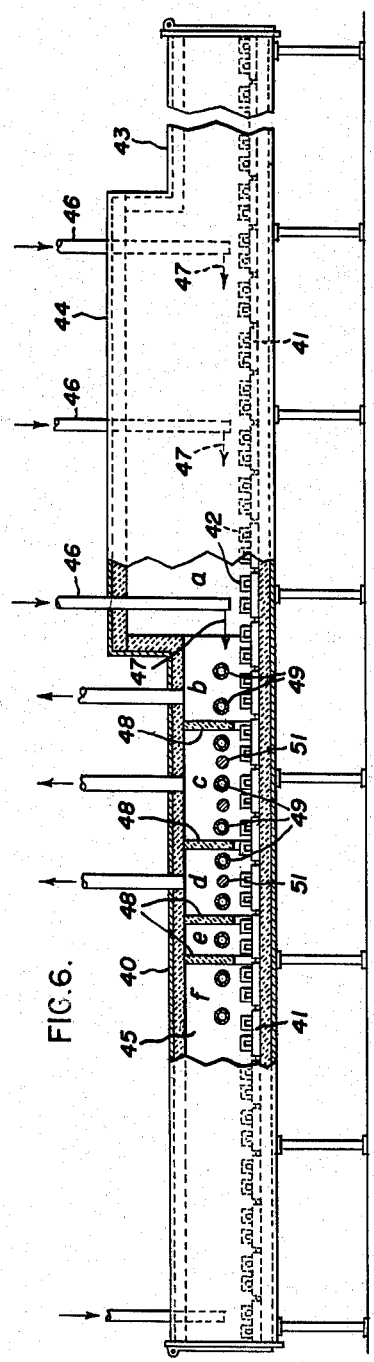
Fig. 6 is a longitudinal sectional side view of a second embodiment of a tunnel kiln constructed in accordance with the present invention.
Figure 7:
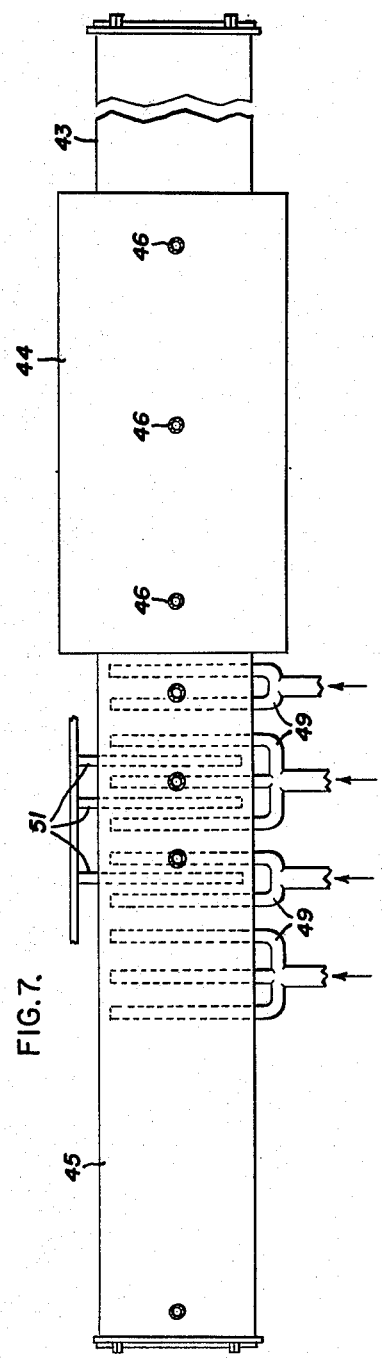
Fig. 7 is a longitudinal sectional plane view of the tunnel kiln illustrated in Fig. 6 taken through plane 7—7.

A second form of a tunnel kiln constructed in accordance with the present invention is illustrated in Figs. 6 and 7 of the drawings. This tunnel kiln is particularly suitable for use in firing small rings of magnesium-manganese ferrites for forming square-loop magnetic memory core units, and comprises an elongated refractory-lined casing 40 having a belt conveyor 41 or other type of conveyance for moving the ferrite materials 42 being fired through the entire length of the kiln. The ferrite materials 42 are loaded in and removed from the tunnel kiln through suitable double-door air locks arranged at each exit of the kiln to completely seal the interior of the kiln from the outside atmosphere. The materials 42 are then moved by conveyor 41 from the right hand to the left hand end of the tunnel kiln so that they progressively travel through a pre-heat portion 43, a sintering portion 44, and a cooling portion 45 of the kiln. The pre-heat portion 43, and the sintering portion 44 of the tunnel kiln shown in Figs. 6 and 7, are not substantially different from the pre-heat and sintering portions of conventional tunnel kilns insofar as the construction of the refractory lining and heating elements are concerned. It is desirable that the tunnel kiln of Figs. 6 and 7 employ electric glo-bar heating elements to achieve the sintering temperatures desired, but as electrically heated tunnel kilns are well known and available in the industry, further description thereof is believed unnecessary. The tunnel kiln of Figs. 6 and 7 has been modified however to include intake ports 46 which comprise pipes that extend through holes in the casing and refractory lining 41 into the sintering portion 44 of the tunnel kiln. The intake ports 46 comprise vertically extending pipes having holes on the ends thereof for directing air or some other gas in the direction of travel of the ferrite ceramic materials 42 being fired, and are disposed in such a manner that the air is directed immediately over the materials 42 as indicated at 47.

The cooling portion 45 of the tunnel kiln of Figs. 6 and 7 differs substantially from similar portions of conventional tunnel kilns in that it includes a plurality of vertically extending refractory baffles 48 which partition the cooling portion 45 of the tunnel kiln into a number of different cooling zones "b"–"f." The refractory baffles 48 are supported from the upper side or roof of the tunnel kiln, and extend down to within a few inches of the top of the conveyor 41 but provide adequate clearance for the ferrite materials 42 to pass thereunder. Each of the different zones "a" through "f" which are formed by the arrangement of baffles 48 includes means for developing atmospheres therein which have temperatures and oxygen contents that differ from zone to zone. This means preferably comprises a plurality of perforated pipes or headers 49 which extend horizontally across the width of the tunnel kiln a few inches above the top of the conveyor belt 41 so as to provide clearance for the ferrite materials 42. The headers 49 have a plurality of ports or openings that open downwardly towards conveyor belt 41 so as to direct the cooling gases supplied thereby directly downward onto the ferrite ceramic materials 42 supported on the conveyor belt. For this purpose, the headers 49 are connected to a cooling gas supply system such as illustrated in either Fig. 3 or Fig. 4 of the drawings for supplying gases having known oxygen contents to the headers. Also disposed in each of the zones "b" through "d" along with the headers 49 are a plurality of horizontally extending electric glo-bar heating elements 51 which extend across the width of the tunnel kiln parallel to the headers 49 and provide a means for maintaining closer control over the temperatures and oxygen contents of the atmospheres of each of the different zones "b" through "d."

In operating the tunnel kiln shown in Figs. 6 and 7, the ferrite ceramic materials to be fired are placed on the conveyor at the right hand end of the tunnel kiln by any suitable loading arrangement, and then travel through the pre-heating portion 43 into the sintering portion 44 of the kiln. In the sintering portion 44 of the kiln, the materials are sintered in an atmosphere of substantially pure air at a temperature in the neighborhood of 2530° F. The ferrite ceramic materials in traveling through the sintering portion 44 soak in the air atmosphere at the sintering temperature of 2530° F. for a sufficient period of time for the oxygen content of the ferrite materials to obtain substantial equilibrium with the oxygen in the air of the sintering zone. From the sintering portion 44, the sintered ferrite materials then travel into the various zones "b" through "f" of the cooling portion 45 of the kiln. Because of the arrangement of refractory baffles 48, and the arrangement of separate gas supply headers 49 together with the electric glo-bar heating elements 51, the temperature and oxygen contents of the atmospheres of the various zones "b" through "d" can be controlled to a very fine degree. In operating the kiln, the different atmospheres in zones "a"–"f" are all determined by some preselected equilibrium atmosphere cooling schedule evolved in the manner described in the above-identified co-pending application. One example of the oxygen contents and temperatures of the atmospheres of the different zones "a"–"f" selected in accordance with one particular equilibrium atmosphere cooling schedule suitable for manufacturing magnesium-manganese memory core ferrites, is set forth in the table below. If the temperatures are as stated at the boundaries between zones and the change in temperature within each zone is approximately linear with distance along the direction of travel of the ferrite material being fired, the following atmosphere conditions will be established in the kiln—

| Zone | O₂ Content (percent by volume) | Temperature (° Fahrenheit) |
| --- | --- | --- |
| "a" and "b" | 20.0 | 2,530° F. |
| "c" | 0.60 | 2,250° F. at boundary between zones "b" and "c." |
| "d" | 0.04 | 2,000° F. at boundary between zones "c" and "d." |
| "e" and "f" | 0.004 | 1,650° F. at boundary between zones "d" and "e." |

Ferrite materials processed in the above-described manner according to the above schedule are allowed to cool in zone "f" which has a substantially pure carbon dioxide atmosphere for a period of time sufficient to reduce the temperature thereof to the neighborhood of 200° F. at which temperature the materials may then be safely introduced into an air atmosphere at normal room temperatures. To accomplish such cooling it is necessary that the cooling zone "f" be physically longer than the other cooling zones "c" and "d."

From the foregoing description, it can be appreciated that the invention provides new and improved tunnel kiln constructions which are capable of firing commercial quantities of ferrite ceramic materials in a plurality of controlled atmospheres having predetermined temperatures and oxygen contents selected in accordance with equilibrium atmosphere cooling schedules.

Obviously, other modifications and variations of the present invention are possible in the light of the above teachings. It is therefore to be understood that changes may be made in the particular embodiments of the invention described herein which are within the full intended scope of the invention as defined by the appended claims.

What I claim as new and desire to secure by Letters Patent of the United States is:

1. In chemical processing apparatus having a tunnel including a heating portion and a cooling portion through which ware is passed in sequence, means for dividing said cooling portion into a plurality of zones having different respective temperatures, a gas induction manifold in each respective temperature zone for continuously supplying atmospheric control gases thereto, gas mixing means having two inlets and having an outlet connected to each of said gas induction manifolds, and a source of first and second gases connected to the respective inlets of each gas mixing means, and means adjacent the boundary of each of said zones for continuously exhausting therefrom the gases therein.

2. In a tunnel kiln for firing ferrite ceramic materials including a tunnel having a heating portion and a cooling portion, and means for moving the ferrite ceramic materials to the heating and cooling portions in sequence, the improvement comprising: means for creating control gases having different oxygen contents to different zones of said tunnel; and a piping system connected to the means for supplying atmospheres comprising a number of main branches, each separately supplying a zone of the tunnel kiln with each of the main branches including a mixing device for mixing together gases having different oxygen content to provide a mixture of the gases having the desired oxygen content to the means for creating control gases, a plurality of branch pipe lines having metering valves connected therein, and a plurality of reservoirs of gases having known oxygen content, the branch pipe lines serving to connect the reservoirs of gases of known content to the mixing devices through metering valves.

3. In chemical processing apparatus having a tunnel including a heating portion and a cooling portion through which ware is passed in sequence: fixed baffle means disposed in the upper portion of said tunnel for dividing said cooling portion into a plurality of zones having different respective temperatures; perforated pipes in each respective temperature zone having downwardly directed ports for continuously supplying atmospheric control gases thereto; gas mixing means having two inlets and having an outlet connected to each of said perforated pipes and a source of first and second gases connected to the respective inlets of each gas mixing means in each of said zones for continuously exhausting therefrom the gases therein; and heating elements in each of said zones.

References Cited in the file of this patent

UNITED STATES PATENTS

| | | |
| --- | --- | --- |
| 1,590,462 | Wilson et al. | June 29, 1926 |
| 1,917,924 | Colbert | July 11, 1933 |
| 2,203,182 | Rendall | June 4, 1940 |
| 2,238,791 | Dorsey | Apr. 15, 1941 |
| 2,514,143 | Robson | July 4, 1950 |